United States Patent
Mutagami

Patent Number: 6,019,857
Date of Patent: *Feb. 1, 2000

[54] CARBURIZED HARDENING PROCESS AND CARBURIZED HARDENED POWER TRANSMISSION MEMBERS

[75] Inventor: Akira Mutagami, Nougata, Japan

[73] Assignee: Mazda Motor Corporation, Hiroshima-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/881,291

[22] Filed: Jun. 24, 1997

Related U.S. Application Data

[63] Continuation of application No. 08/413,153, Mar. 29, 1995, abandoned.

[30] Foreign Application Priority Data

Mar. 29, 1994 [JP] Japan ..................... 6-084135

[51] Int. Cl.[7] ....................................................... C21D 9/32
[52] U.S. Cl. ........................... 148/233; 148/573; 148/586
[58] Field of Search .................... 148/208, 233, 148/573, 586

[56] References Cited

U.S. PATENT DOCUMENTS 3,177,563  4/1965  Pennell ................... 29/159.2

FOREIGN PATENT DOCUMENTS

| | | |
|---|---|---|
| 0 371 340 A1 | 6/1990 | European Pat. Off. . |
| 1 003 779 | 3/1957 | Germany . |
| 51-132129 | 11/1976 | Japan ....................................... 148/208 |
| 60-208421 | 10/1985 | Japan . |
| A-2-133527 | 5/1990 | Japan . |
| 1748912 | 7/1992 | U.S.S.R. . |

OTHER PUBLICATIONS

J. Sauter et al., *Einflussgrössen auf die Leistungsfähigkeit einsatzgehärteter Zahnräder*, Haerterei Technische Mitteilungen, vol. 45, No. 2, p. 98–104, Mar. 1990.

English Language Search Report, dated Jul. 31, 1995. for application No. EP95 10 4564.

Primary Examiner—Sikyin Ip
Attorney, Agent, or Firm—Morrison & Foerster

[57] ABSTRACT

Power transmission member such as gears with high breaking strength of the edge portion (A) of the root and high spalling resistance of the tooth side (B) is obtained. The work such as gears, etc. is cooled after carburization by plasma carburizing, etc. and the work surface is high-frequency hardened, and for heating at the time of high-frequency hardening, the heating conditions are set in such a manner that the heating temperature at the root becomes higher than that at the tooth side and time for holding to high temperature becomes long. This promotes solid solution of carbonate at the root and increases the remaining austenite volume after hardening (25–35% for a good-rule-of-thumb) as well as improves toughness at the edge. On the other hand, on the tooth side, the remaining austenite volume decreases (5–15% for a good-rule-of-thumb) and spalling resistance improves.

5 Claims, 4 Drawing Sheets

Pen recorder

CARBURIZED HARDENING PROCESS AND CARBURIZED HARDENED POWER TRANSMISSION MEMBERS

This application is a continuation of application Ser. No. 08/413,153, filed Mar. 29, 1995, now abandoned.

BACKGROUND OF THE INVENTION

1. Field of the Invention

The present invention relates to a carburized hardening process for a power transmission member such as gears, in which teeth are formed at equal intervals on the peripherary with a groove therebetween, to which side high surface pressure is applied, and to which root (edge portion) high bending stress is applied.

2. Description of Related Art

For gears such as pinions of automotive differential gears, in general, case-hardened steel is used, on the surface of which is gas carburized hardened or plasma carburized hardened for improving fatigue strength and wear resistance before application. However, because in gas carburized hardening and plasma carburized hardening generally practiced, the work is heated at high temperature for a long time, impurities such as phosphorus (P) or sulfur (S) segregates at the grain boundary or carbide precipitates in a mesh-form to lower the strength of the grain boundary.

Consequently, crack is likely to be generated at the edge portion of the root subjected to high bending stress (shown with A in FIG. 1) with the grain boundary as an initiation point, and cracks quickly propagate, resulting in a problem of short breaking strength. In the tooth side subjected to high surface pressure (shown with B in FIG. 1), there was also a problem of short spalling resistance.

SUMMARY OF THE INVENTION

In view of these conventional problems mentioned above, a first object of the present invention is to provide a method for producing a power transmission member provided with improved breaking strength at the edge portion as well as spalling resistance of the tooth side.

Further, a second object of the present invention is to provide a power transmission member provided with improved breaking strength at the edge portion as well as spalling resistance of the tooth sides.

According to a first aspect of the present invention, there is provided with a carburized hardening process which comprises steps for cooling the power transmission member with the teeth formed on the peripherary at equal intervals after carburization and for successively carrying out surface-hardening, and is designed to heat the said power transmission member in such a manner that heating temperature at the root is higher than that of the tooth side during the above surface-hardening. Examples of the said power transmission member include gears, sprockets, splines, etc., and for material, case-hardened steel is used. For the carburization means, gas carburization and plasma carburization are used as required, but plasma carburization is desirable from the viewpoint of both carburization efficiency and uniformity.

In the said carburized hardening method, it is desirable to set temperature of the root to be higher than that of the tooth side from preheating through soaking to proper heating throughout during surface-hardening, and it is desirable to decarburize the carburized layer, particularly, the uppermost surface of the carburized layer at the root by heating during surface-hardening, and to bring the carbon concentration of the said uppermost surface lower than the carbon concentration of the layer just below. It is desirable to use high-frequency induction heating for heating of surface-hardening.

On the other hand, the power transmission member manufactured according to the present invention is characterized in that the power transmission member with the teeth formed at equal intervals on the peripherary is subjected to the said carburization and surface-hardening treatments, the remaining austenite volume of the carburized layer at the root is 25–35% and the remaining austenite volume at the carburized layer at the tooth side is less than that. And it is desirable that the remaining austenite volume of the carburized layer at the tooth side is preferably 5–15% and the carbon concentration of the carburized layer, in particular, the uppermost surface of the carburized layer at the root is brought to be lower than the carbon concentration of the layer just below.

In this invention, because in surface-hardening treatment, the heating temperature at the root is set to be higher than that on the tooth side, carbides precipitated along the grain boundary in the carburized layer of the root are more readily soluble in the parent phase and the carbon concentration of the portion increases, thereby relatively increasing the remaining austenite volume at the root after surface-hardening. Because the heating temperature of the root is set higher than that at the tooth side, it takes longer time to cool the power transmission member from the said heating temperature to martensite transformation temperature at the root, and this also causes an increase of the remaining austenite volume.

A proper amount of remaining austenite in the carburized layer at the root has an effect to improve the bending breaking strength at the edge portion, and it is desirable to allow austenite to remain about 25–35% in the area ratio as a good-rule-of-thumb. If remaining austenite is less than this level, toughness of the structure itself lacks, causing carbides which are unable to be soluble in the parent phase to exist in large quantities as initiation points of cracks, and reversely if it is more than this level, the strength of the structure itself lowers, generating a problem that the edge portion tends to deform. The remaining austenite volume can be adjusted as required depending on the heating temperature during surface-hardening and the holding time at the high temperature region (as the holding time at the high-temperature region increases, the solid solubility of carbide is enhanced and the remaining austenite volume increases).

On the other hand, since the heating temperature at the tooth side is set lower than that at the root, the solid-soluble rate of the carbide of the parent phase is small and the carbon concentration at the tooth side portion does not increase as much as that at the root, resulting in relatively small remaining austenite volume after surface-hardening. Similarly, since heating temperature of the tooth side is set lower than that of the root, time required to be cooled from the said heating temperature to the martensite deformation temperature becomes short at the tooth side, and this also causes the remaining austenite volume to decrease.

In the carburized layer of the tooth side, it is desirable from an aspect of improved spalling resistance that the structure should have a less remaining austenite volume and a required volume of carbide dispersed in granular form, and as a good-rule-of-thumb, it is recommended to achieve about 5–15% remaining austenite volume in the area ratio. The fact that the remaining austenite is less than this level means that there is a large possibility of carbides precipitated during carburization to exist in mesh-form as it is without hardly being soluble, and conversely, if it is more than this level, the solid solubility of carbide increases and the precipitating carbide rate decreases, both causing the spalling resistance to lower.

When a normal surface-hardening method which uniformly heats both the tooth side and the root is applied, contrary to this invention, the remaining austenite volume at the root becomes, in general, lower than that on the tooth side. That is, when members such as gears are carburized, the carbon concentration of the carburized layer is relatively high at the tooth side which has a nearly simple plane form, and the carbon concentration tends to be relatively low at the portion with a dented shape such as the root.

Setting the temperature at the root higher than that at the tooth side from preheating through soaking to proper heating throughout in the case of surface-hardening results in maintaining the temperature at the root to a high level over a relatively long time, exhibiting an effect to accelerate solid-solubility of carbide in the carburized layer at the root.

In general, the uppermost surface of the carburized layer tends to be over-carburized and the carbon concentration at the uppermost surface after carburization becomes higher than that of the layer below but it temperature is held in the high-temperature region during surface-hardening for a long time to a certain extent, the uppermost surface of the carburized layer is decarburized and grain boundary embrittlement is hard to occur at the portion as the carbon concentration lowers. Consequently, when decarburization of the uppermost surface is promoted, the heating conditions should be set in such a manner that the holding time at the high-temperature region becomes longer.

When the heating conditions during surface-hardening are set in such a manner that the heating temperature at the root is higher than that of the tooth side from preheating through soaking to proper heating throughout, the root is held to higher temperature for a long time, causing the carbon concentration to lower, in particular, at the uppermost surface of the root carburized layer and breaking strength at the edge portion of the root improves. It is recommended to carry out decarburization in such a manner that the carbon concentration of the uppermost surface, for example, from the surface to 20 $\mu$m, is less than the eutectoid point, in particular, about 0.6–0.75%.

For a specific heating means for bringing the heating temperature at the root higher than that on the tooth side, high-frequency induction heating known in the surface-hardening field is preferable, and adjustment of the frequency, outputs, etc. enables easy setting of the heating temperature in accordance with the portions as described above with one piece of coil. In high-frequency induction heating, the member surface rises to a specified temperature in a relatively short time and causes recrystalization, with crystal grains being refined as well as impurities segregated at the grain boundary before heating is allowed to be soluble in grains, and carbides are solid-soluble in grains or the portion not solid-soluble is separated to become granular.

BRIEF DESCRIPTION OF THE DRAWINGS

These and other objects and features of the present invention will become clear from the following description taken in conjunction with the preferred examples thereof with reference to the accompanying drawings throughout which like parts are designated by like reference numerals, and in which.

EXAMPLES

Figure 1:
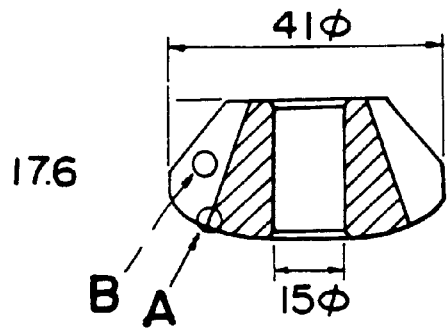
FIG. 1 is a cross sectional view showing a pinion gear of the differential gear.

Now, examples according to the present invention will be described in detail hereinafter. The work W used is a pinion gear (FIG. 1) of a differential gear 41 mm$\phi$ in outside diameter, 17.6 mm in high, and 15 mm in bore diameter made of case-hardened steel comprising C: 0.18%, Si: 0.09%, Mn: 0.69%, P: 0.006%, S: 0.021%, Cr: 1.02%, Mo: 0.39%, Al: 0.35%, Nb: 0.035%, and balance Fe, which is gas carburized hardened to be designated as a conventional example and high-frequency hardened after plasma carburizing to be designated as an example, respectively, and to which static breaking test and spalling test were carried out.

Gas carburized hardening of the said conventional example intends to achieve 0.9% surface carbon concentration and comprises the steps for (1) gas carburizing treatment at 920° C. for 5 hours, (2) 120° C. oil-quenching after holding at 860° C. for one hour, (3) reheating to 180° C. and tempering for 2 hours.

On the other hand, in the said examples, similarly, plasma carburization intends to achieve 0.9% surface carbon concentration and is carried out in the procedure of (1) placing the work in a vacuum furnace and soaking it at 1000° C. for 10 minutes in vacuum, (2) introducing H$_2$ gas into the vacuum furnace to adjust the furnace inner pressure to be 2 Torr, glow-discharging at 400V and 1.5 A, and performing clean-up treatment for 20 minutes, (3) removing H$_2$ gas, introducing C$_3$H$_8$ gas to adjust the furnace inner pressure to be 3 Torr, glow-discharging at 360V and 2 A, and carburizing for 50 minutes, (4) evacuating the furnace inside and after diffusion-treating for 72 minutes, slowly cooling, and after cooling, high-frequency surface-hardening was carried out, and finally tempering treatment was performed at 180° C. for 2 hours.

Figure 2:
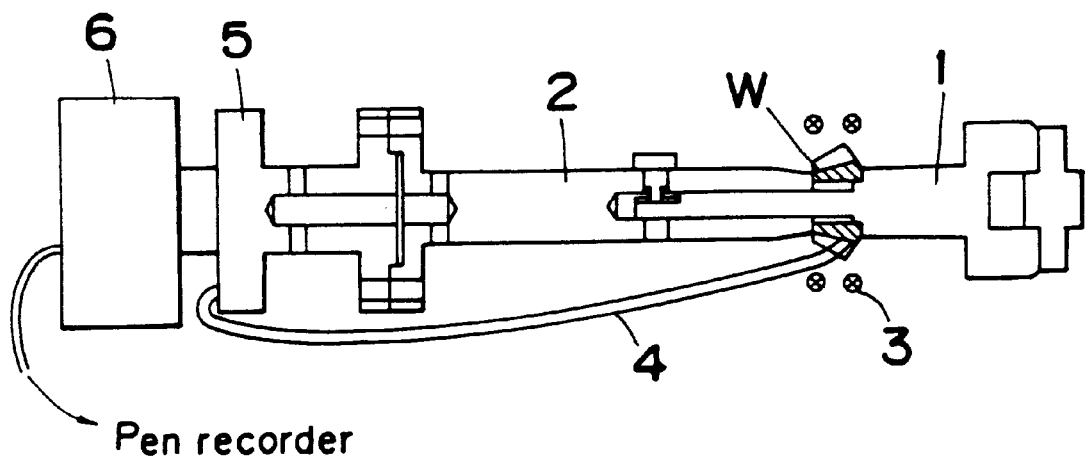
FIG. 2 is a schematic illustration of a high-frequency hardening test equipment.
Figure 3:
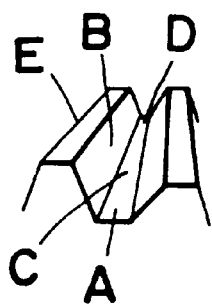
FIG. 3 is a drawing showing each measuring portion of the pinion gear of the differential gear.

High-frequency hardening of the example, as shown in FIG. 2, was carried out by holding the work W between jig 1 connected to a motor not illustrated to freely rotate and jig 2 which was rotated, arranging high-frequency coil 3 in the circumferential position, heating for a total of 42 seconds under the conditions shown in Table 1, and cooling the work by spraying 80° C. oil for 35 seconds after heating. In order to investigate the surface temperature of work W, thermos couples 4 were installed to surface portions A–E (see FIG. 3) of work W, and the detection values were designed to be recorded on the pen recorder through slip ring 5 and fixed supporter 6. The surface portion A of work W is the root on the heel side of the pinion gear (corresponds to A in FIG. 1), B the pitch surface (corresponds to B in FIG. 1), C the root center, D the root on the toe side, and E the tooth tip.

TABLE 1

| | Preheating (1) | Holding (1) | Preheating (2) | Holding (2) | Heating |
|---|---|---|---|---|---|
| | | Soaking | | | |
| Output (kW) | 9 | — | 9 | — | 18 |
| Voltage (V) | 210 | — | 210 | — | 310 |
| Frequency (kHz) | 7.1 | — | 7.1 | — | 7.1 |
| Time (sec) | 25 | 6 | 1 | 6 | 4 |
| Rotating speed (rpm) | 120 | — | — | — | — |

Figure 4:
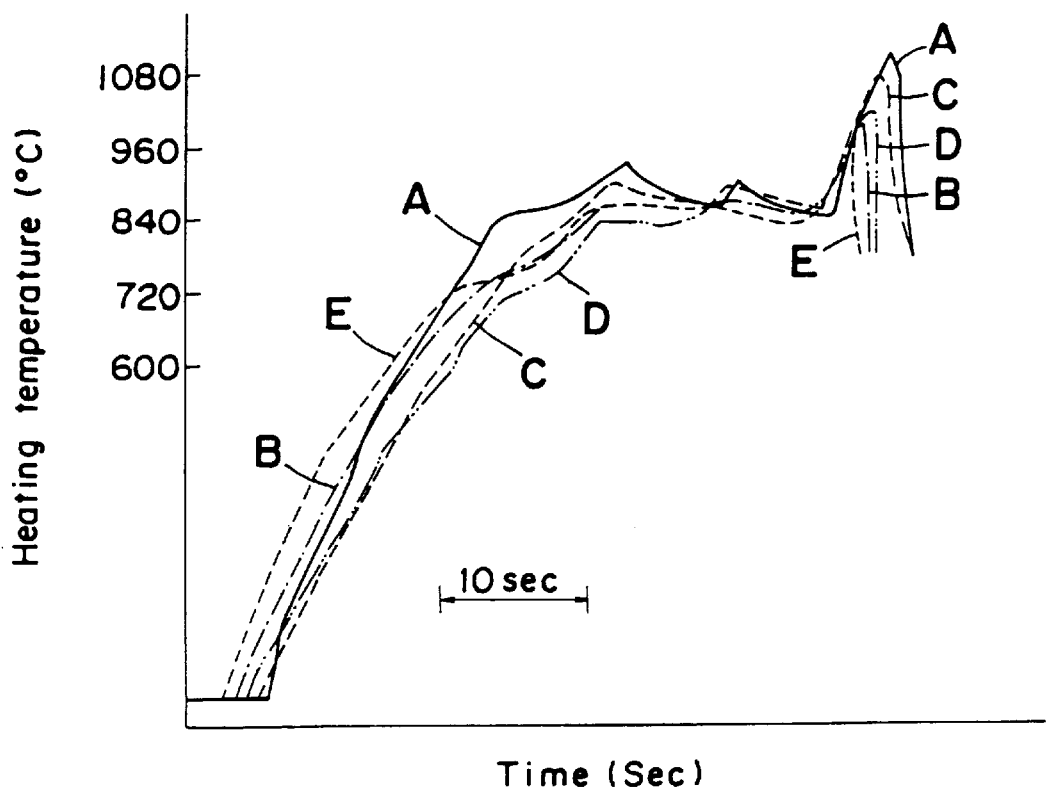
FIG. 4 is a heating temperature-time graph by high-frequency heating.
Figure 5:
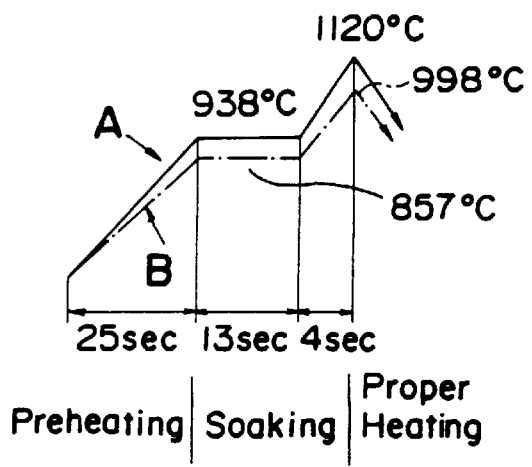
FIG. 5 is a schematic illustration simplifying the above graph.

When FIG. 4 which shows the temperature measurement results is observed, the maximum heating temperature at the root is high, in particular, the heel-side root A to which high bending stress is applied to edge portion, is heated to high temperature throughout preheating, soaking and proper heating as compared to the pitch surface B. For information, simplifying temperature-time of the heel-side root A and that of pitch surface B produces FIG. 5.

Figure 6:
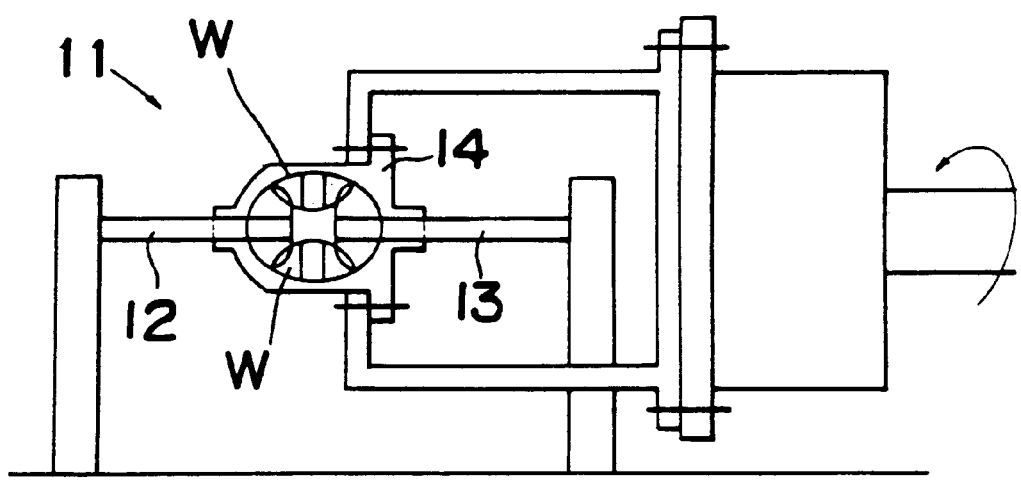
FIG. 6 is a schematic illustration of the static breaking test equipment.

The static breaking test was carried out by incorporating the work W into the differential gear unit 11 (see FIG. 6), fixing output shafts 12, 13, rotating the gear case 14 to twist, and measuring torque when the work W breaks, and as shown in Table 2, high static breaking strength (mean value of three breaking strengths) as compared to conventional examples was obtained. This may be attributed to the fact in that carbide is solid-soluble because the root, in particular, the heel-side root is held to high temperature for a long time in the example, the volume of remaining austenite at the portion increases and that of carbide decreases, toughness of the edge portion increases and propagation of cracks delays, and as later described, the carbon concentration at the uppermost surface lowers and the initiation points of cracks decrease. The area ratio of remaining austenite at the heel-side root A was about 30% on average, and about 10% on average at the pitch surface.

TABLE 2

| | Example | Conventional example |
|---|---|---|
| Static breaking strength (kgm) | 644 | 550 |
| Spalling life ($\times 10^4$ N) | 11.07 | 2.26 |

The spalling test was carried out at the input rotating speed to the transmission 262 rpm, input torque 117–123 N.m, rotating speed of the other output shaft of the unit 50 rpm, and the output shaft torque 459–471 N.m by incorporating the same work W into the differential gear unit, directly connecting it to the engine via the transmission, and fixing one output shaft of the unit. And the vibration of the unit is constantly detected, and from the time when the vibration exceeds a certain reference value, the number of cycles of the moment is computed and is designated as spalling life. As shown in Table 2, in the example, larger spalling life (mean value of two workpieces) was obtained as compared to conventional examples.

Figure 7A:
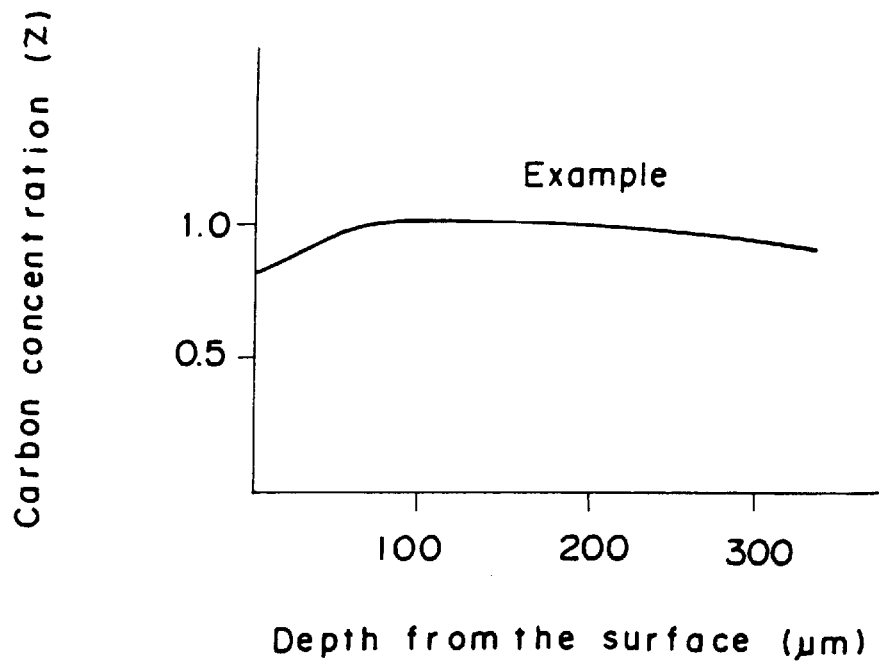
FIG. 7 is a view showing the surface carbon concentration after high-frequency hardening.

In this example, the relationship between the depth from the surface of the root A and the carbon concentration was investigated, and as shown in FIG. 7(a), the carbon concentration at the uppermost surface section covering the surface to the vicinity of 50 μm lowers. This is attributed to decarburization from the surface which is promoted by the temperature held extraordinarily high for heating in high-frequency hardening in order to promote solid solubility of carbides at the root.

Figure 7B:
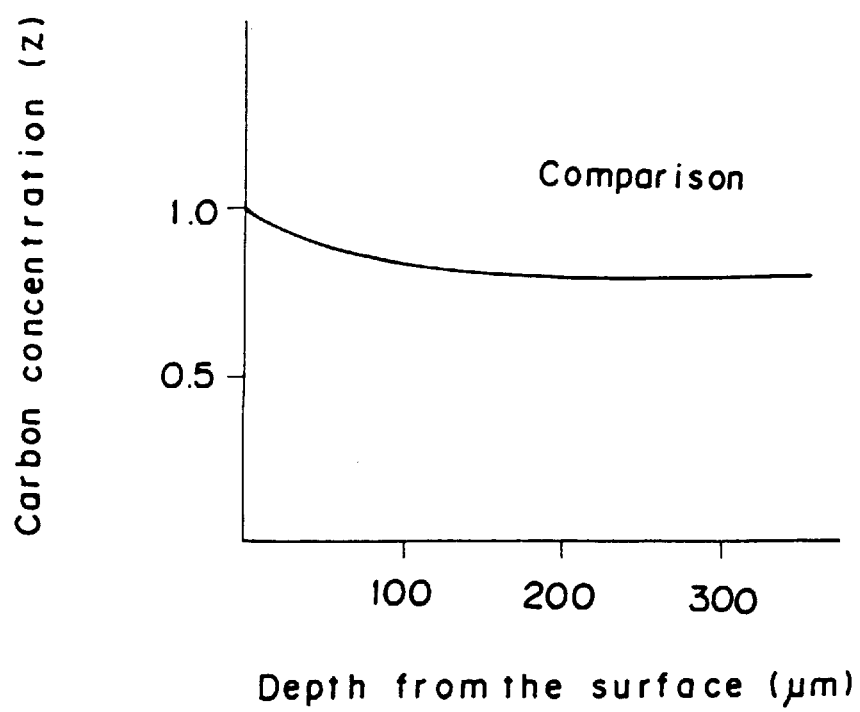

For comparison, when workpieces were high-frequency heated at frequency 8.2 kHz, output 40 kw, and heating time 9 seconds in place of the high-frequency heating conditions of the example (surface-hardening conditions popularly adopted for this type of pinion gear), decarburization from the surface did not occur, possibly because the time for holding high temperature is short (FIG. 7(b)).

According to this invention, setting heating temperature at the root higher than that on the tooth side during the surface-hardening step of the power transmission members such as gears, etc. can increase the toughness at the root and improve the breaking strength of the edge portion, and on the other hand, can improve the spalling resistance at the tooth side.

When high-temperature heating is continued for a long time to a certain extent during the surface-hardening step to decarburize the uppermost surface of the carburized layer, decarburization is likely to be promoted at the root which is particularly held to high temperature and the breaking strength of the edge portion can be improved.

What is claimed is:

1. A carburized hardening process for a power transmission member provided at equal intervals on its periphery with teeth, wherein each tooth has a root part and a side part, comprising the steps of:

(a) carburizing the power transmission member to form a carburized layer on each tooth of said power transmission member, (b) cooling the power transmission member and (c) surface-hardening the power transmission member by heating the tooth of the power transmission member in a manner such that the temperature at the root part is set to be higher than that at the side part so that carbides precipitated during said carburizing along a grain boundary in the carburized layer of the root part are more soluble in a parent phase than that in the carburized layer of the side part to produce a greater residual austenite volume in the carburized layer at the root part than that at the side part.

2. A carburized hardening process according to claim 1, wherein heating during the surface-hardening step is carried out by setting temperature of the root part to be higher than that of the tooth side part from preheating throughout soaking to proper heating.

3. A carburized hardening process according to claim 1 or 2 wherein the uppermost surface of the carburized layer is decarburized by heating during the surface-hardening step, and the carbon concentration at the said uppermost surface is lowered from the carbon concentration of the layer right below.

4. A carburized hardening process according to claim 3 in which the uppermost surface of the carburized layer at the root is decarburized by heating during the surface-hardening to make the carbon concentration of the said uppermost surface lowered from that of the layer just below.

5. A carburized hardening process according to claim 1, wherein the surface-harding is a high-frequency hardening.

* * * * *